D. L. RICHARDS.
FILTER.
APPLICATION FILED JUNE 4, 1917.
1,261,439.
Patented Apr. 2, 1918.
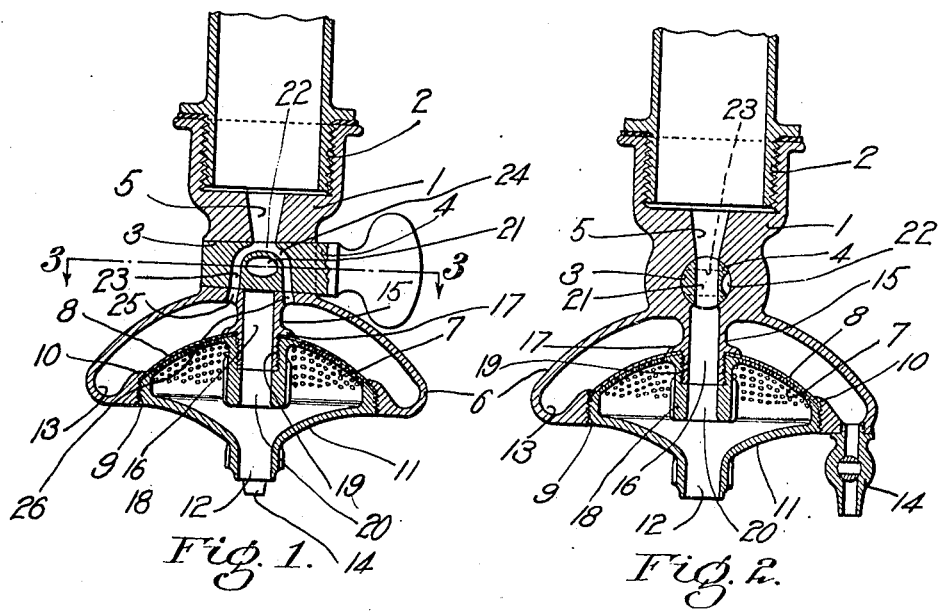
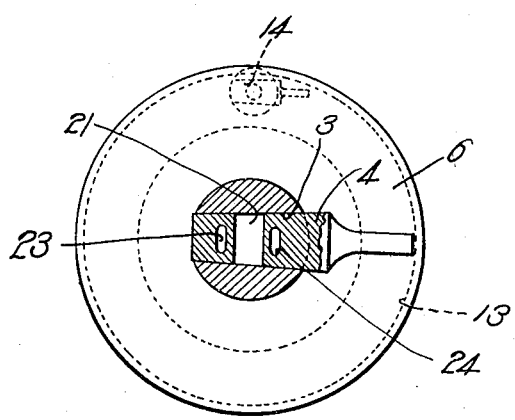
Inventor:
David L. Richards,
By his attorney
Charles V. Goodwin

UNITED STATES PATENT OFFICE.

DAVID L. RICHARDS, OF BOSTON, MASSACHUSETTS.

FILTER.

1,261,439.

Specification of Letters Patent.

Patented Apr. 2, 1918.

Application filed June 4, 1917. Serial No. 172,834.

*To all whom it may concern:*

Be it known that I, DAVID L. RICHARDS, a citizen of the United States, residing at Boston, in the county of Suffolk and State of Massachusetts, have invented new and useful Improvements in Filters, of which the following is a specification.

This invention relates to improvements in filters and has for its object to provide a simple, compact device adapted to be operated to permit liquid to pass directly therethrough unfiltered when large quantities are needed and thereby save the filtering element from becoming unnecessarily clogged or said device may be operated to filter the liquid when desired.

Another object of the invention is to provide means for washing out or cleaning the filter, all three functions being accomplished without the removing or the taking apart of the filter.

The invention consists in the combination and arrangement of parts set forth in the following specification and particularly pointed out in the claims.

Referring to the drawings:

Figure 1 is a vertical section through a filter embodying my invention, parts of said filter being arranged to filter liquid passing therethrough.

Fig. 2 is a vertical section taken substantially at right angles to the section shown in Fig. 1, illustrating the parts of the filter in position to supply unfiltered liquid from the faucet to which the filter is attached.

Fig. 3 is a section taken on the line 3—3 of Fig. 1.

Like numerals refer to like parts throughout the several views of the drawings.

In the drawings, 1 is a casing having means preferably consisting of an internally screw threaded portion 2 adapted to be attached to a faucet. Adjacent to the portion 2 is a tapered transverse opening 3 adapted to receive a tapered valve 4. The opening 3 is connected, by means of a passage 5, with the screw threaded portion 2. Directly beneath the opening 3 of the casing 1 said casing is enlarged at 6 to form a filtering compartment within which is arranged a filtering medium preferably consisting of a very fine meshed screen 7 which is slightly arched upwardly and may, if desired, support a disk 8 of suitable porosity to serve as an additional filtering medium.

The portion of the casing which forms the compartment 6 has an opening 9 at the bottom thereof provided with internal screw threads. A flange 10 is formed at the upper end of the opening 9 and against this flange the screen 7 and also the disk 8 are adapted to be secured by means of a funnel shaped member 11 which has a central opening 12 constituting the discharge port for the filtering. This member is adapted to be screwed into the opening 9 and against said screen.

Formed in the portion of the casing 1 immediately surrounding the flange 10 is an annular trough 13 which is slightly below said flange. A drip cock 14 is attached to the casing communicating with the lowermost portion of said trough. Within the casing 1 is a centrally disposed depending tube 15 provided with a passage 16 extending therethrough, preferably alining with the discharge port 12 and the passage 5.

Formed on the tube 15 is a flange 17 against which the disk 8 and the screen 7 are adapted to seat and in order to secure a positive seating of said disk and screen against said flange said screen is provided with a downwardly projecting tubular section 18 which is internally screw threaded at 19 which threads engage corresponding threads formed at the lower end of the tube 15. The section 18 is knurled or otherwise formed to assist in screwing the screen upon said tube which operation must be accomplished before the funnel shaped member 11 is attached to the casing.

The member 18 is also provided with a central opening 20 coinciding with the passage 16. The valve 4 is a two way valve consisting of a passage 21 extending transversely thereof and adapted to provide communication between the passage 5 and the passage 16. The other passage of said valve is arranged substantially at right angles to the passage 21 and has a single inlet opening 22 adapted to aline with the passage 5. This passage separates to form two passages 23 and 24 which straddle the passage 21 and are adapted to aline with ports 25 and 26 respectively disposed upon opposite sides of the central tube 15, said last named ports communicating with the compartment 6 of the casing.

The arrangement of the two passages in the valve 4 is such that when one is open the other is closed, that is to say, when the passages 23 and 24 are disposed, as in Fig. 1, in alinement with the ports 25 and 26 and the inlet end of the passages 23 and 24 alines with the passage 5 of the casing liquid from the faucet to which the filter is attached will pass directly to the filtering compartment, thence through the screen 7 and be discharged through the discharge port 12 of the funnel shaped member 11, thereby filtering all liquid passing through the filter.

When large amounts of liquid are needed and it is not essential that they be filtered the valve 4 is rotated to the position shown in Fig. 2 so that the passage 21 therethrough will aline with the passage 5 and the passage 16, permitting said liquid to travel directly through the filter, cutting out the filtering element comprising the disk 8 and screen 7.

It is often desirable to flush out the filtering compartment so as to remove all deposits from the upper surface of the screen and for this purpose the drip cock 14 has been provided which may be opened when it is desired to wash out said compartment and the liquid passing into said compartment will naturally seek the lines of least resistance and thereby pass from the ports 25 and 26 downwardly over the arched filtering element to the trough 13 and be discharged therefrom through the cock 14. This may be done at regular intervals and thereby eliminate the necessity of removing the filtering element from the compartment 6 to clean the same.

Having thus specifically described my invention what I claim and desire by Letters Patent to secure is:

1. A filter having, in combination, a direct discharge tube, a filtering section, surrounding said discharge tube, and a valve adapted to provide communication either through said filtering section or through said discharge tube.

2. A filter having, in combination, a casing, means adapted to secure said casing to a faucet, a central discharge tube, a convex screen arranged in said casing surrounding said tube with the crown of said screen directed toward said faucet, a discharge valve inserted in said casing adjacent to the rim of said screen, and a valve interposed between said screen and said faucet adapted to provide communication either through said central tube or through said convex screen.

3. A filter having, in combination, a casing, means adapted to secure said casing to a faucet, a discharge tube arranged centrally of said casing, a filtering element arranged transversely of said casing around said discharge tube and extending to the outer wall of said casing, means for detachably securing said filtering element within said casing, and a valve adapted to provide communication either with said filtering element or with said discharge tube.

4. A filter having, in combination, a casing, a filtering element disposed transversely of said casing, an annular trough formed within said casing in direct communication with and surrounding said filtering element, the bottom of said trough being below the surface of said filtering element, and a discharge valve connected with said lowermost point of said trough.

5. A filter having, in combination, a casing provided with an inlet port at the top thereof, a convex filtering screen arranged transversely of said casing with the crown of said screen directed toward said inlet port, an annular trough formed within said casing in communication with and surrounding and below the outer edge of said screen, and a discharge valve connected with the lowermost point of said trough.

In testimony whereof I have hereunto set my hand in presence of two subscribing witnesses.

DAVID L. RICHARDS.

Witnesses:
  SYDNEY E. TAFT,
  HATTIE E. STRATTON.

Copies of this patent may be obtained for five cents each, by addressing the "Commissioner of Patents, Washington, D. C."